(12) United States Patent  (10) Patent No.: US 6,634,053 B2
Bae  (45) Date of Patent: Oct. 21, 2003

(54) APPARATUS FOR ACTIVATING A HEAT CONDUCTIVE WIRE BY DETECTING A ROTATING ANGLE OF A WIPER ARM

(75) Inventor: Bong-Yull Bae, Kyuongki-do (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 10/020,201

(22) Filed: Dec. 18, 2001

(65) Prior Publication Data

US 2002/0112305 A1 Aug. 22, 2002

(30) Foreign Application Priority Data

Dec. 20, 2000 (KR) .................................. 10-2000-79313

(51) Int. Cl.$^7$ ................................................. B60S 1/38
(52) U.S. Cl. ................................ 15/250.07; 15/250.06; 15/250.05; 219/202
(58) Field of Search .................... 15/250.05, 250.06, 15/250.07, 250.08, 250.09, 250.13; 318/DIG. 2; 219/202, 203

(56) References Cited

U.S. PATENT DOCUMENTS

| 4,497,083 A | * | 2/1985 | Nielsen, Jr. et al. ..... 15/250.06 |
| 5,086,260 A | * | 2/1992 | Ito .......................... 15/250.13 |
| 5,287,585 A | * | 2/1994 | Yamamoto et al. ...... 15/250.13 |

* cited by examiner

*Primary Examiner*—Gary K. Graham
(74) *Attorney, Agent, or Firm*—Antonelli, Terry, Stout & Kraus, LLP

(57) ABSTRACT

The present invention relates to an apparatus for activating heat conductive wires by detecting a rotating angle of a wiper arm, wherein said heat conductive wires Installed on the both side of a wiper blade are activated when the detected rotating angle is smaller than a predetermined angle, so that the accumulated snow is melted away due to the heat emitted from said heat conductive wires.

3 Claims, 2 Drawing Sheets

APPARATUS FOR ACTIVATING A HEAT CONDUCTIVE WIRE BY DETECTING A ROTATING ANGLE OF A WIPER ARM

BACKGROUND OF THE INVENTION

1. Field of the Invention

The present invention relates to an apparatus for activating a heat conductive wire installed on a wiper blade, and more particularly, to an apparatus for activating a heat conductive wire installed on a wiper blade by detecting a rotating angle of a wiper arm.

2. Description of the Prior Art

Due to the rapid development of motor vehicle industry, the number of people who possess a vehicle has been gradually increasing. As the result, the average time that drivers spend in a vehicle has also increased in step with the growth in.the number of people who possess vehicles. Accordingly, vehicle research and development regarding various human-oriented facilities has been strongly requested.

Recently, devices facilitating safe driving, such as rearview mirrors and wiper assemblies for removing precipitation and dirt accumulated on a windshield, have been considered as a most important factor in the manufacturing and design of a vehicle.

The accompanying FIG. 1 schematically depicts a conventional wiper assembly of a vehicle.

As shown in FIG. 1, the wiper assembly comprises a wiper arm 4, a wiper body 6, a wiper motor (not shown) for reciprocating the wiper arm 4 wherein one end of which is connected to a crank (not shown) while the other end is connected to the wiper body 6 which is formed in an elongated bar shape, and a wiper blade 12 made of a rubber installed on the bottom surface of the wiper body 6.

Because the removal of dirt and/or precipitation accumulated on a front windshield 8 is actually conducted by the wiper blade 12, the wiper blade 12 is made of a flexible rubber material having a good resilient characteristic and is removably attached on the bottom surface of the wiper body 6.

In the actual operation of the wiper assembly, it is Impossible to completely remove the snow accumulated on the front windshield when there is a heavy snowfall. In particular, there is generated on area 10 of an accumulation of snow that cannot be removed from the right and left edge of the front windshield because the wiper assembly cannot proceed further thereon and delivers snow which is added to the accumulation.

SUMMARY OF THE INVENTION

Considering the above-described disadvantages of the conventional art, the present invention provides an apparatus for actuating heat conductive wires installed on both sides of a wiper blade, by detecting a rotating angle of a wiper arm, so that the accumulated snow can be melted due to the heat emitted by the heat conductive wires when the detected rotating angle of a wiper arm is smaller than a predetermined angle.

BRIEF DESCRIPTION OF THE ACCOMPANYING DRAWINGS

| 2: wiper assembly | 4: wiper arm |
| 6: wiper body | 8: front windshield |
| 12: wiper blade | 14: heat conductive wire |
| 14a: groove | 16: rotating angle detector |
| 18: data storage element | 20: controlling element |
| 24: transistor | 26: relay switch |

DETAILED DESCRIPTION OF THE INVENTION

In order to achieve the above-described function, the present invention is an apparatus which is coupled to a wiper assembly comprising a wiper arm which supports a wiper blade which supports a wiper body, a crank equipped under the hood of a vehicle for transferring a driving force to the wiper arm, and a wiper motor for developing said driving force for reciprocating said wiper arm whose one end is connected to the crank, said apparatus comprising:

a heat conductive wire made of electrical resistant material for outputting heat in response to electric current;

a wiping angle detector for sensing a rotating angle of said wiper arm;

a data storage element storing data regarding the rotating angle of said wiper arm;

a controlling element generating a controlling signal for activating the heat conductive wire when the rotating angle detected by said wiping angle detector is lower than a predetermined angle;

an electric power supply providing electric current for activating the heat conductive wire;

a transistor conducting electric current from an emitter to a collector in response to the controlling signal produced by said controlling element;

and a relay switch which is turned on by means of electromotive force induced by electric current conducting from said transistor, whereby said heat conductive wire is eventually activated when said rotating angle of the wiper arm, is smaller than the predetermined angle.

Preferably, said wiping angle detector senses the rotating angle of the wiper arm by means of the electroluminescence/light receiving sensors located on/beneath a surface of the crank which is connected to the wiper arm.

More preferably, said heat conductive wires fit into a groove formed along the wiper blade, which tightly contacts with a windshield and is installed on the bottom surface of the wiper body.

Hereinafter, the present invention will be described in detail referring to the accompanying drawings.

Figure 1:
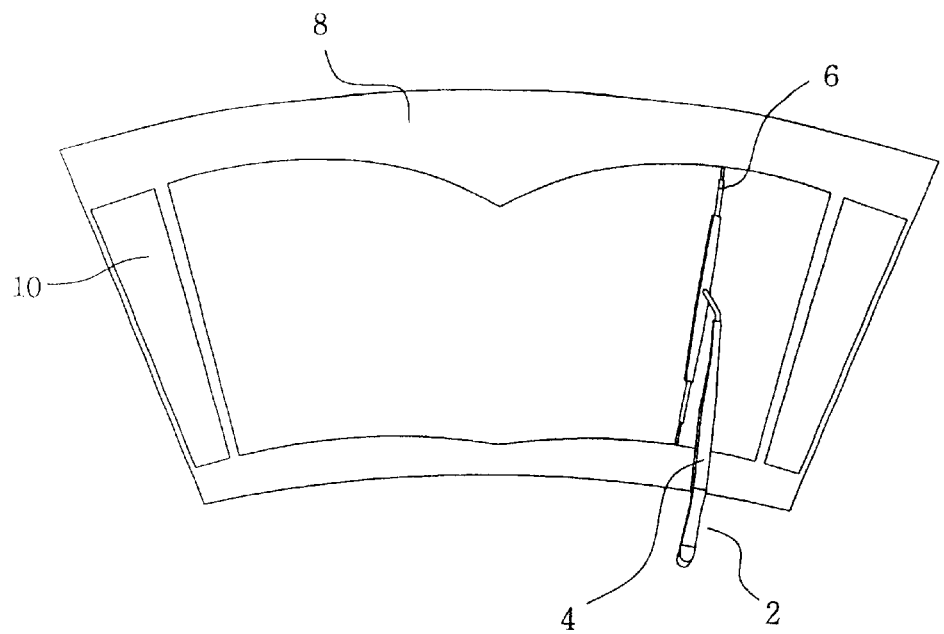
FIG. 1 is a schematic view of a conventional wiper assembly of a vehicle.
Figure 2:
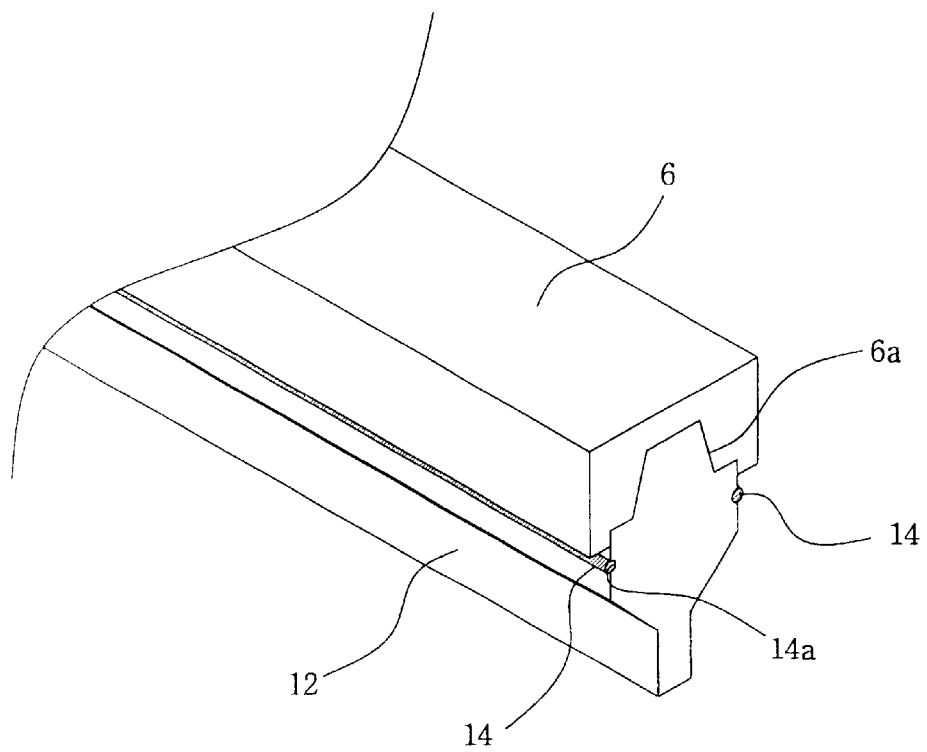
FIG. 2 is a prospective view of a wiper body and a wiper blade having heat conductive wires thereon according to the present Invention.

FIG. 2 is a prospective view of a wiper body 6 and wiper blade 12 having heat conductive wires thereon according to the present invention. As shown in FIG. 2, the wiper blade 12 is Inserted into a fixing recession 6a formed on the bottom of the wiper body 6 so as to tightly contact with the windshield and remove dirt and/or precipitation being accumulated on the front windshield.

Furthermore, a pair of grooves 14a are provided for containing heat conductive wires 14 which are formed on the both sides of the wiper blade 12. The heat conductive wires are made of electrical resistant material which output heat when electric current passes therethrough. In the present Invention, electric current is supplied by the battery of a vehicle (not shown) into the heat conductive wires 14 through the electric wire arranged inside of the wiper arm 4.

Regarding the location of the grooves 14a, even though the present invention only discloses the grooves 14a formed on that both sides of the wiper blade 12, the spirit and scope of the present invention is not restricted by this embodiment. Namely, the location of the grooves 14a can be selectively changed, if necessary.

Figure 3:
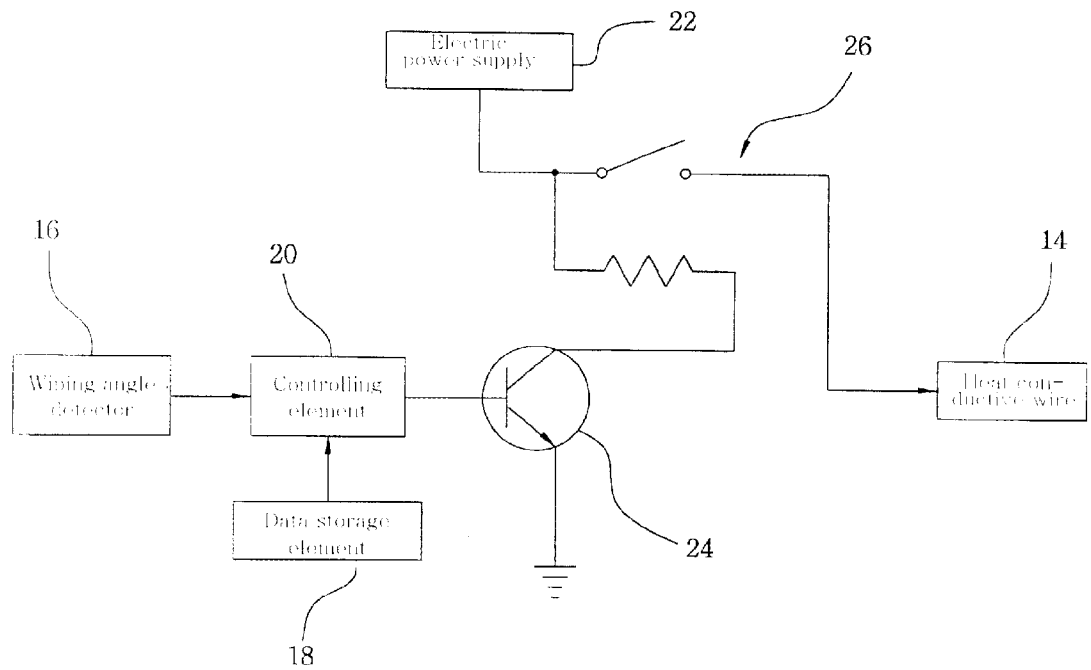
FIG. 3 is a block diagram showing the elements of an embodiment of the present invention.

FIG. 3 is a block diagram showing elements of the embodiment according to the present invention. As shown in FIG. 3, numeric 16 refers to a wiping angle detector sensing the rotating angle of a wiper arm, wherein the wiping angle detector can be embodied by means of conventional electroluminescence/light receiving sensors (not shown) located on/beneath a surface of the crank which is connected to the wiper arm 4.

Furthermore, number 18 refers to a data storage element having a predetermined rotating angle which is used for determining the activation of a heat conductive wire 14.

Furthermore, number 20 refers to a controlling element generating a high-level controlling signal so as to activate the heat conductive wire 14 when the rotating angle detected by the wiping angle detector is lower than a predetermined limit.

Furthermore, number 22 refers to an electric power supply providing electric current for activating the heat conductive wire. The present invention employs the battery of a vehicle as the electric power supply.

Furthermore, number 24 refers to a transistor which conducts electric current from an emitter to a collector in response to the high-level controlling signal produced by the controlling element 20.

Furthermore, number 26 refers to a relay switch being turned on by means of electromotive force induced by electric current conducted from the transistor.

Hereinafter, the embodiment of the present invention, an apparatus for activating a heat conductive wire by detecting the rotating angle of the wiper arm, comprising the above-described elements, will be detailed referring to the accompanying drawings.

Figure 4:
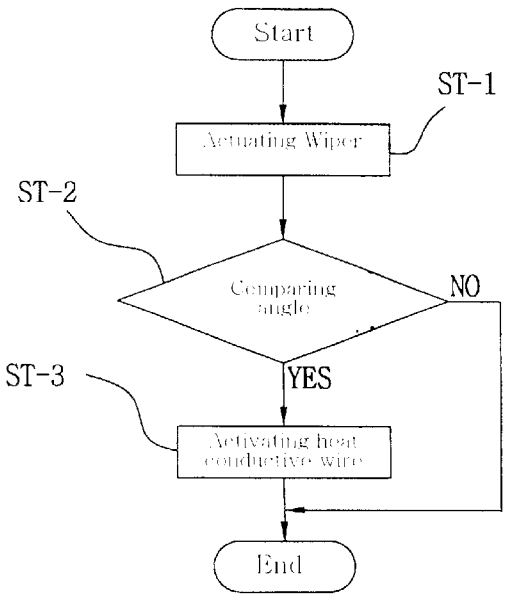
FIG. 4 is a flow chart representing the flow of a signal In the embodiment according to the present invention.

FIG. 4 is a flow chart representing the flow of a signal in the embodiment according to the present invention.

Initially, the first step (ST-1) to actuate the wiper assembly 2 is activated by a driver who perceives a snowfall accumulated con the front windshield 8. In the first step, if the accumulated snow freezes or exceeds a certain limit, it is impossible for the wiper assembly 2 to maintain a normal rotating angle thereby.

Subsequently, the second step (ST-2) compares the sensed rotating angle of wiper arm with a predetermined angle stored in a data storage element and generates a high-level controlling signal when the sensed rotating angle is smaller than the predetermined angle, is activated.

Subsequently, the third step (ST-3) comprising the following sub-steps is activated. The sub-steps are:

Sub-step 1: a transistor conducts electric current from an emitter to a collector in response to the high-level controlling signal generated by the controlling element;

Sub-step 2: a relay switch is turned on by means of electromotive force induced by electric current conducting from the transistor; and Sub-step 3: finally, the heat conductive wires are activated.

Eventually, the snow accumulated on the left and right sides of the front windshield is melted by the heat output from the heat conductive wires installed in the grooves which are formed on the both sides of the wiper blade, whereby a wide visual-range through the windshield can be secured for a driver.

On the other hand, when the sensed rotating angle is larger than (or same as) the predetermined angle, the controlling element continuously generates a low-level signal, whereby the transistor does not conduct electric current to the emitter. Accordingly, the heat conductive wires are maintained in state of non-activation.

The present invention may be embodied in other specific forms without departing from its spirit or essential characteristics.

What is claimed is:

1. An apparatus which is coupled to a wiper assembly comprising a wiper arm which supports a wiper body which supports a wiper blade, a crank equipped under the hood of a vehicle for transferring a driving force to the wiper arm, and a wiper motor for developing said driving force for reciprocating said wiper arm whose one end is connected to the crank, said apparatus comprising:

a heat conductive wire made of electrical resistant material for outputting heat in response to electric current;

a wiping angle detector for sensing a rotating angle of said wiper arm;

a data storage element storing data regarding the rotating angle of said wiper arm;

a controlling element generating a controlling signal for activating the heat conductive wire when the rotating angle detected by said wiping angle detector is less than a predetermined angle;

an electric power supply providing electric current for activating the heat conductive wire;

a transistor for conducting electric current from an emitter to a collector in response to the controlling signal produced by said controlling element;

and a relay switch which is turned on by means of electromotive force induced by electric current conducted from said transistor, whereby said heat conductive wire is eventually activated when said rotating angle of the wiper arm is less than the predetermined angle.

2. The apparatus according to the claim 1, wherein said wiping angle detector senses a rotating angle of the wiper arm by means of electroluminescence/light receiving sensors located on or beneath a surface of the crank which is connected to the wiper arm.

3. The apparatus according to the claim 1, wherein said heat conductive wire is fit into a groove formed along the wiper blade which contacts with a windshield and is installed on a bottom surface of the wiper body.

* * * * *